United States Patent [19]

Videtto, Jr.

[11] Patent Number: 5,054,467

[45] Date of Patent: Oct. 8, 1991

[54] SOLAR HOT DOG COOKER

[76] Inventor: Donald W. Videtto, Jr., 420 N. Basque Ave., Fullerton, Calif. 92633

[21] Appl. No.: 625,083

[22] Filed: Dec. 10, 1990

[51] Int. Cl.⁵ ............... A47J 33/00; A47J 37/00
[52] U.S. Cl. ................... 126/451; 99/341; 99/441; 99/445
[58] Field of Search ............ 99/341, 441, 444, 445, 99/446, 447, 425, 467; 219/10.55 E; 126/417, 451

[56] References Cited

U.S. PATENT DOCUMENTS

| | | | |
|---|---|---|---|
| D. 258,106 | 2/1981 | Vieceli | 99/441 |
| D. 259,384 | 6/1981 | Levin | 99/441 |
| 1,266,912 | 5/1918 | Bradbury | 99/441 |
| 2,804,530 | 9/1957 | McGuinness | 99/441 |
| 2,895,405 | 7/1959 | Hopkins | 99/341 |
| 3,025,851 | 3/1962 | Steinberg | 126/451 |
| 3,028,856 | 4/1962 | Daymon | 126/451 |
| 3,098,924 | 7/1963 | Salton | 99/341 |
| 3,364,896 | 1/1968 | Jamison | 99/441 |
| 4,477,705 | 10/1984 | Danley | 219/10.55 E |
| 4,585,915 | 4/1986 | Moore | 219/10.55 E |
| 4,667,391 | 5/1987 | Garbar | 99/467 |

FOREIGN PATENT DOCUMENTS

| | | | |
|---|---|---|---|
| 1019153 | 11/1957 | Fed. Rep. of Germany | 99/446 |
| 639385 | 6/1950 | United Kingdom | 99/341 |

*Primary Examiner*—Philip R. Coe
*Assistant Examiner*—Terrence R. Till

[57] ABSTRACT

The present invention relates to solar hot dog cookers. A dark M-W cross sectioned cylindrical hot dog holder holds at least two hot dogs. The hot dogs are placed on the holder and covered by a dark, solar energy absorbing flat plate. The combination is placed on a plastic base having raised edges to prevent spilling of grease. The base is covered with a top generally transparent to solar energy waves and placed in the sun. Depending on solar intensity, about twenty minutes are usually sufficient to cook the hot dogs. The cooker may then be reused. The cooker also works when solar energy is not at a maximum, such as certain cloudy days, evenings, cold days, etc.

1 Claim, 1 Drawing Sheet

U.S. Patent        Oct. 8, 1991        5,054,467
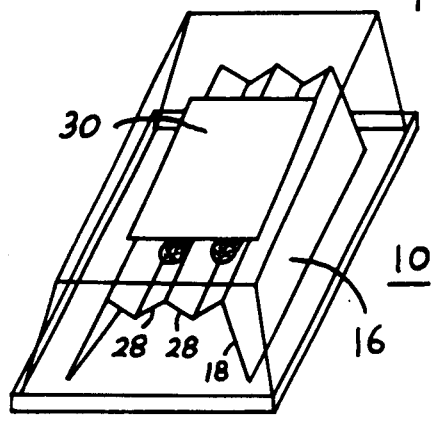
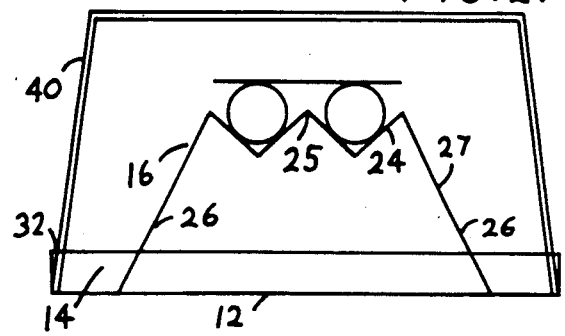
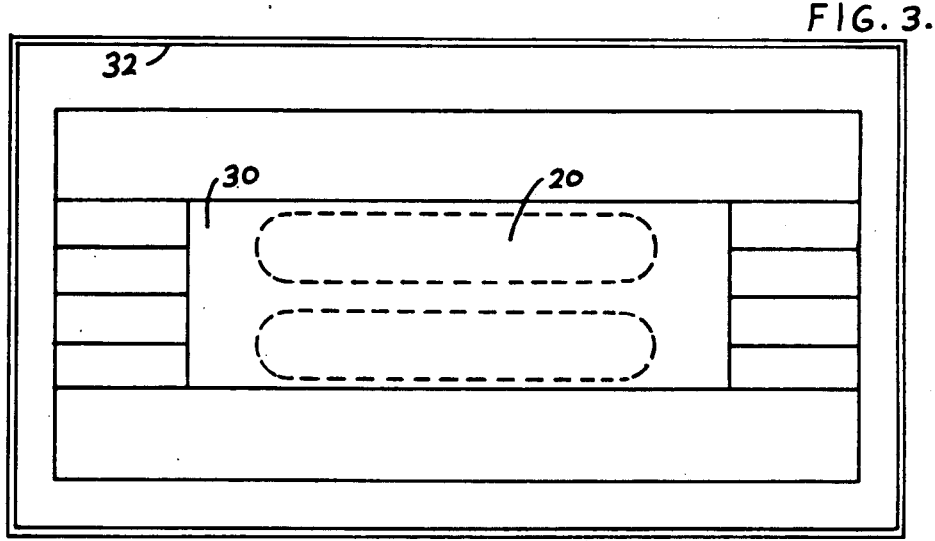
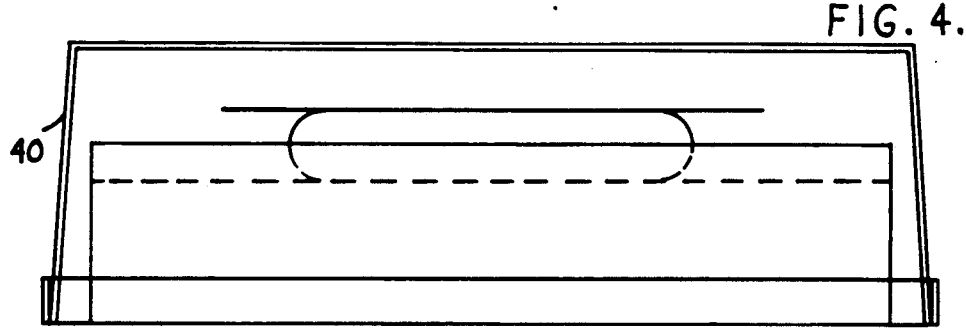
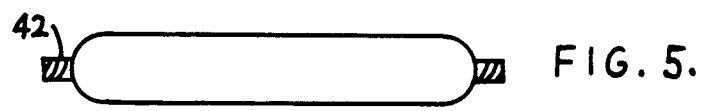

SOLAR HOT DOG COOKER

BACKGROUND OF THE INVENTION

1. Field of the Invention

The present invention relates to solar meat cookers.

2. Description of the Prior Art

Solar cookers date to prehistoric times. This art has obtained new life with the US energy situation since 1973. In addition, people now have more ecology consciousness and are more receptive to ecologically sound devices and more likely to pay for them.

Ideally, such cookers should be inexpensive, relatively quick, handy and safe to use, rugged, easy to clean, small and easy to store, simple to use, and possessed of the other advantages sought in similar beach and picnic type cooking devices. They should also be capable of cooking when the sun is not bright or is slightly clouded over.

Applicant knows of no such device for cooking hot dogs.

SUMMARY OF THE INVENTION

A solar hot dog cooker is presented. The solar hot dog cooker comprises a rugged flat base having closed and slightly raised edges to enable the base to retain grease, and fabricated from a heat generally non conductive material generally impervious to hot dog grease in air at temperatures generated in solar cooking.

The solar hot dog cooker also includes a dark, rugged solar energy absorbing generally cylindrical M-W cross sectioned hot dog holder capable of holding at least two hot dogs and fabricated from a heat conducting material relatively impervious chemically to hot dog grease in air at solar cooking temperatures, which is oriented during use with both M and W upright and is placed during use in the rugged flat base, and holds at least two hot dogs. By M-W cross section is meant that the holder has non vertical angled sides coupled to each other by a series of at least two V's. Two V's would hold two hot dogs, and each additional V would hold an additional hot dog if the V's were about as long as a hot dog. While the term hot dog is used, it is obvious that other foods could also be cooked in the solar hot dog cooker. If the V's were longer, they could hold additional hot dogs to fill the length, ie, if twice as long two hot dogs, etc. By cylindrical is meant that the cross section describes substantially the entire length of the solar hot dog holder. In operation, the solar hot dog cooker hot dog holder is placed inside the base, and selected hot dogs to be cooked are placed in the V's also known as V slots.

The solar hot dog cooker also includes a generally planar, dark, solar energy absorbing, impervious to hot dog grease at temperatures generated in solar cooking, hot dog cover fabricated from rugged, heat conductive material and of length and width less than that of the hot dog holder, but large enough to cover cooking hot dogs on the hot dog holder. The cover is placed over the hot dogs to be cooked to increase solar radiation absorbed by the hot dogs and reduce drying during cooking.

The solar hot dog cooker also includes a rugged, cap fitting relatively air tight either inside or around and over the outside of the base during cooking. The cap is generally transparent to major solar energy bearing radiation frequencies, the cap is fabricated from a generally non heat conductive material impervious to hot dog grease at solar cooking temperatures. The purpose of the cap is to retain heat and juices while permitting nearly all solar radiation to pass through to the hot dogs.

The solar cooker cooks fastest when solar radiation received is at a maximum, but also can cook hot dogs when substantial but less solar radiation is received, such as on cloudy and partly cloudy days, and mornings after sun rise and evenings before sun set. When less solar radiation is received, cooking takes relatively longer. At maximum solar radiation, the solar hot dog cooker can cook two hot dogs in about ten minutes. The solar hot dog cooker can, of course cook other meats and foods such as hamburgers, thin chicken, vegetables, and any other foods that can be wrapped in aluminum foil. The foil use is good practice in that it keeps the solar hot dog cooker clean, and cleaning in a beach, camping out, or picnic setting is usually inconvenient.

DRAWING DESCRIPTION

Reference should be made at this time to the following detailed description which should be read in conjunction with the following drawings of which:

FIG. 1 is a ¾ view of the invention;
FIG. 2 is an end view of the invention;
FIG. 3 is a top view of the invention;
FIG. 4 is a side view of the invention;
FIG. 5 is a view of a hot dog.

DETAILED DESCRIPTION OF THE INVENTION

A solar hot dog cooker 10 is presented. The solar hot dog cooker 10 comprises a rugged flat base 12 having closed and slightly raised edges 14 to enable the base 12 to retain liquid grease, and fabricated from a heat generally non conductive material generally impervious to hot dog grease in air at temperatures generated in solar cooking.

The solar hot dog cooker 10 also includes a dark, rugged solar energy absorbing generally cylindrical M-W cross sectioned hot dog holder 16 capable of holding at least two hot dogs 20 and fabricated from a heat conducting material relatively impervious chemically to hot dog grease in air at solar cooking temperatures, which is oriented during use with both M 27 and W 25 upright and is placed during use in the rugged flat base 12, and holds at least two hot dogs 20. By M-W cross section 18 is meant that the holder 16 has two, in the best design non vertical angled sides 26 (although the sides 26 could be vertical) coupled to each other by a series of at least two V's 28. Two V's 28 would hold two hot dogs 20, and each additional V 28 would hold an additional hot dog 20 if the V's 28 were about as long as a hot dog 20. While the term hot dog 20 is used, it is obvious that other foods could also be cooked in the solar hot dog cooker 10. If the V's 28 were longer, they could hold additional hot dogs 20 to fill the length, ie, if twice as long, two hot dogs 20 or equivalent amount of other food, etc. By cylindrical is meant that the cross section 18 describes substantially the entire length of the solar hot dog holder 16. In operation, the solar hot dog cooker 10 hot dog holder 16 is placed Inside the base 12, and selected hot dogs 20 or other foods to be cooked to be cooked are placed in the V's also known as V slots.

The solar hot dog cooker 10 also includes a generally planar, dark, solar energy absorbing, impervious to hot dog grease at temperatures generated in solar cooking, hot dog cover 30 fabricated from dark, solar energy absorbing, rugged, heat conductive material and of length and width less than that of the hot dog holder 16, but large enough to cover cooking hot dogs 20 or other cooking food on the hot dog holder 16. Impervious as used herein means it is not ordinarily damaged during use. The cover 30 is placed over the hot dogs 20 to be cooked to increase solar radiation absorbed by the hot dogs 20 and reduce drying during cooking.

The solar hot dog cooker 10 also includes a rugged cap 40 removably fitting relatively air tight, that is coupled around and over the outside 32 of the base during cooking. Alternatively, as shown in FIG. 2, the cap 40 may be slightly smaller than the edge 32 and may fit inside the base 12 outside edge 32. The cap 40 is generally transparent to major solar energy bearing radiation frequencies, the cap 40 is fabricated from a generally non heat conductive material impervious to hot dog grease at solar cooking temperatures. The purpose of the cap 40 is to retain heat and juices while permitting nearly all solar radiation to pass through to the hot dogs 20.

The solar cooker 10 cooks fastest when solar radiation received is at a maximum, but also can cook hot dogs 20 when substantial but less solar radiation is received, such as on cloudy and partly cloudy days, and mornings after sun rise and evenings before sun set. When less solar radiation is received, cooking takes relatively longer. At maximum solar radiation, the solar hot dog cooker 10 can cook two hot dogs 20 in about ten minutes. The solar hot dog cooker 10 can, of course cook other meats and foods such as hamburgers, thin chicken, vegetables, and other foods that can be wrapped in aluminum foil 42. The foil 42 use illustrated in FIG. 5 is good practice in that it keeps the solar hot dog cooker 10 clean, and cleaning in a beach, camping out, or picnic setting is usually inconvenient.

A particular example of the invention has been disclosed herein. Other examples will be obvious to those skilled in the art. The invention is limited only by the following claims.

I claim:
1. A solar hot dog cooker, comprising:
a rugged flat base having closed and slightly raised edges and fabricated from a heat generally non conductive material generally impervious to hot dog grease in air at temperatures generated in solar cooking;
a dark, rugged solar energy absorbing generally cylindrical cross sectioned hot dog holder wherein the cylinder has a length substantially greater than its width and a non circular cross section resembling a capital M changed in that the v which forms the center two lines of the capital M is replaced by a small w shape defining two adjacent v shaped cross section grooves capable of holding meat such as hot dogs to be cooked, so that the symmetrical cross section has a long outer edge member coupled at an angle of about 90 degrees to a center member coupled at an angle of about 90 degrees to the center member of the opposite side thereby forming two adjacent v shapes along the top of the generally M shaped cross section capable of holding at least two hot dogs and fabricated from a heat conducting material relatively impervious chemically to hot dog grease in air at solar cooking temperatures, which is oriented during use with both M and W upright and is placed during use in the rugged flat base, and holds at least two hot dogs;
a generally planar, dark, solar energy absorbing impervious to hot dog grease at temperatures generated in solar cooking, hot dog cover fabricated from rugged, heat conductive material and of length and width less than that of the hot dog holder, but large enough to cover cooking hot dogs on the hot dog holder; and
a rugged, cap fitting relatively air tight and coupled to the base, the cap being generally transparent to major solar energy bearing radiation frequencies, the cap being fabricated from a generally non heat conductive material impervious to hot dog grease at solar cooking temperatures.

* * * * *